United States Patent Office 3,400,115
Patented Sept. 3, 1968

3,400,115
PROCESS FOR THE POLYMERIZATION OF DIOLEFINS AND CATALYST THEREFOR
Francois Dawans, Brussels, Belgium, and Philippe Teyssie, Colombes, and Emmanuel Goldenberg, Poissy, France, assignors to Institut Francais du Petrole, des Carburants et Lubrifiants, Rueil-Malmaison, France
No Drawing. Filed Feb. 18, 1966, Ser. No. 528,362
Claims priority, application France, Feb. 18, 1965, 6,176; July 3, 1965, 23,417
13 Claims. (Cl. 260—94.3)

This invention relates to a process for the production of polymers of conjugated diolefins, and in particular to a process wherein a novel catalyst composition is employed.

A principal object of this invention, therefore, is to provide an improved process for the production of polymers of conjugated diolefins.

Another object is to provide a novel catalyst composition.

Still another object is to provide polymers having improved properties.

Upon further study of the specification and claims, other objects and advantages of the present invention will become apparent.

The improved process of this invention results in the production of 1,4-stereoregular polymers having high molecular weights. In particular, the process is beneficial for the production of a polybutadiene which is essentially cis,1,4 and which exhibits an intrinsic viscosity, measured in benzene at 30° C., of 0.1–4 and even higher.

The process of this invention can be employed equally as well in connection with the copolymerization of different conjugated diolefins, or the copolymerization of a diolefin with other polymerizable monomers, in particular vinyl compounds, such as mono-α-ethylenically unsaturated hydrocarbons.

Before going into the details of the process, it is to be emphasized that there are many advantages obtained thereby. For example, the reaction velocity and conversion rate are generally increased substantially. Furthermore, the catalyst used in the process is capable of directing the polymerization selectively to the production of particular stereospecific polymers having very high molecular weights as measured by their increased intrinsic viscosities.

To attain the objects of this invention and to realize the above-described advantages, there is provided a process which comprises passing a conjugated diolefin into intimate contact with a catalyst comprising:

(a) A compound of an element from Groups IV through VIII, inclusive, of the Periodic Table of the Elements, Subgroups A and B being included. The Periodic Table of the Elements is found, for example, on page 881 of the "International Encyclopedia of Chemical Science," D. Van Nostrand Company, Inc., Princeton, N.J.; Toronto, Canada; New York City; and London (1964). This compound is preferably a halogenide of a metal of Groups IV–A, V–A and/or VI–A, and for example a halogenide of titanium, vanadium, or molybdenum.

(b) A coordination compound of nickel and a cyclopolyolefin having at least 6, preferably 6–12, carbon atoms in the ring. The ring can also be substituted, preferably by hydrocarbon radicals, particularly by at least one alkyl group of 1–18 carbon atoms. Such substituted moieties can occur on each ring carbon atom, but preferably they are limited to 1–4 alkyl groups per ring.

The above-defined components (a) and (b) are effective to produce the desired polymers of this invention only when such components are used together. If one attempts to employ either component (a) or component (b) by itself in the process, the polymers of this invention are not produced.

Specific examples of component (a) include: $TiCl_4$, $TiCl_3$, $TiBr_4$, $TiI_4$, $TiF_4$, $ZrCl_4$, $VCl_4$, $MoCl_5$, $FeCl_3$, $NiCl_2$, $SnCl_4$, and $SbCl_5$.

With respect to such halides, there is a correlation between the atomic weight of the halogen ion and the proportion of cis and trans isomers in the produced polymer. By using iodides, the resultant polymers contain a substantial amount of trans,1,4 polymer. Conversely, if it is desired to produce a cis,1,4 polymer, it is advantageous to employ a chloride.

Moreover, it has been found that not only is there a stereospecific effect with respect to the type of halide that is employed, but there is also a stereospecific effect with respect to the particular species of each halide. For example, it is highly preferred to employ $MoCl_5$ to obtain 1,4-cis polybutadiene having a high intrinsic viscosity. Titanium tetrachloride is also a good choice for obtaining the 1,4-cis configuration, but lower viscosities are obtained. Another species of component (a) which leads to a high content of the 1,4-cis configuration is $SbCl_5$, but the disadvantage in the use of this component is that the rate of the polymerization reaction is slower (however, in some cases it may be preferred to employ this component for that very same reason).

Referring now to component (b), preferred species include the following:

bis(1,5-cyclooctadiene) nickel
cyclohexadienenickel
cyclooctatetraenenickel
1,5,9-centro-cyclododecatrienenickel
bis(3-ethyl-1,5-cyclooctadiene)nickel
bis(3,7-dimethyl-1,5-cyclooctadiene)nickel
bis(3-phenyl-1,5-cyclooctadiene)nickel Of the above-listed compounds, the most preferred is bis(1,5-cyclooctadiene)nickel, since it promotes a more rapid reaction and a higher degree of polymerisation.

Referring now to the above-tabulated preferred coordination compounds, it is seen that these compounds embrace cyclopolyolefins having up to 4 double bonds in the ring, and either one or two rings per nickel atom.

Although the polymerization reaction can be conducted in the pure monomer, it is advantageous to perform the reaction in a hydrocarbon solvent which is aromatic, alicyclic, or aliphatic. Additionally, instead of the preferred hydrocarbon solvent, it is possible to employ polar solvents, such as methylene chloride or chlorobenzene, and even proton-containing solvents, such as alcohols, for example absolute ethanol. In the latter case of absolute ethanol, the polymerization reaction is preferential for the production of the 1,4-trans crystalline polybutadiene isomer.

The polymerization reaction is usually conducted at a temperature of about −40 to +120° C., preferably between 0 and 60° C.

Component (b) is generally employed in a ratio of about 0.05–5 mols, preferably 0.1–0.5 mol, per 100 mols of monomer.

It is furthermore advantageous to add component (a) to component (b) in the presence of at least a portion of the monomer, as in this way secondary reactions can be avoided. The remainder of the monomer can be added later.

A particularly convenient operating method is to mix component (a) with component (b) previously contacted with at least a portion of the monomer under conditions wherein no significant polymerization can take place, for example, at a temperature below 0° C. It is then very simple to initiate the polymerization thereafter by merely raising the temperature of the polymerization mixture.

The molar ratio of component (b) to component (a) is generally 0.1:1 to 25:1, preferably 0.5:1 to 20:1. From the standpoint of obtaining a maximum degree of conversion and a high intrinsic viscosity, the molar ratio is maintained between 0.5:1 and 2.5:1.

Aside from components (a) and (b), it is to be understood that this invention also contemplates additional catalytic components which do not deleteriously affect the results obtained by the catalyst composed of (a) and (b) alone. Furthermore, other various additives can be employed which are compatible therewith, such as chain regulators, shortstopping agents, etc. conventionally used with coordination catalysts, for example with Ziegler type catalysts.

The polymerization reaction can be conducted under any pressure which is sufficient to maintain substantially all of the reaction mixture in the liquid phase. This includes normal pressure, subatmospheric and superatmospheric pressures. From a practical standpoint, the pressure employed is usually a function of the particular solvent and temperature that are selected for the polymerization. On the other hand, it is also to be appreciated that the conventional expedient of employing an inert pressurized gas above the reaction mixture can be utilized when it is desired to use higher temperatures without boiling the solvent.

Technique-wise, the process can be conducted either continuously or batchwise. In the latter case, it is possible to first introduce the catalyst and the solvent into the reactor and then add separate batches of the monomer.

In the particular process of this invention, as well as in other processes set forth in the prior art using somewhat similar catalysts, it is necessary to avoid the introduction of certain impurities which can deleteriously affect the activity of the catalyst. Such impurities are carbon dioxide and oxygen. Consequently, it is expedient to eliminate such impurities from the reactants, as well as the inert solvent. Furthermore, it is necessary to purge the reactor of air prior to the polymerization reaction.

When the polymerization reaction is terminated the reaction mixture is treated in order to inactivate the catalyst and recover the product. There are several alternative procedures for accomplishing these steps.

In one procedure, the solvent is merely steam distilled away from the non-volatile polymer. In another procedure, an additive is employed to inactivate the catalyst and precipitate the polymer. The polymer is then separated from the solvent by such conventional techniques as decantation or filtration.

It is often preferred to add an amount of catalyst inactivator which does not at the same time precipitate the polymer. The reason for this is that an anti-oxidant can be added to the solution so that it is intimately admixed with the polymer when precipitation is finally accomplished. Such anti-oxidants are β-phenylnaphthylamine and para-tert.-butyl-cresol. After their addition, the polymer is precipitated by the addition of a non-solvent, such as ethyl or isopropyl alcohol. It is also advantageous to add a chelating agent to the alcohol before the alcohol is used for precipitation. In this way, residual metallic components are extracted from the solution and remain in the mother liquor rather than in the polymer. Examples of such chelating agents are the disodium salt of ethylenediaminetetracetic acid and acetylacetone, many others being described in the literature.

It is to be further understood that still other methods can be employed to recover the polymer from solution. After recovery, the polymer is then dried.

The finally obtained polymers of this invention are generally rubbery solids. On the other hand, it is also possible to produce polymers ranging from liquids to hard solids by varying the operating conditions. It is well known, for example, that liquid polymers can be obtained if the molecular weight of the polymer is kept low by terminating the polymerization reaction relatively quickly.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. In these examples, the microstructure of the polymers was determined by infrared spectrophotometry according to the method of R. S. Silas, J. Yates, and V. Thornton, "Analytical Chemistry," 31 (4) 529 (1959).

Example 1.—Comparative example showing failure of process when component (a) of catalyst is omitted Under an inert atmosphere, there are added 5 g. liquid butadiene-1,3 to a solution of 0.1 g. bis-(cyclooctadiene) nickel of the formula $(C_8H_{12})_2$ Ni in 3 cc. toluene, the mol percent of the nickel compound being 0.37%, based on the mols of butadiene. After agitation at 55° C. for 48 hours, only traces of polybutadiene are obtained, of which the major amount is of the 1,4-trans form. This example, therefore, demonstrates that when a cyclopolyolefin nickel compound is used by itself, there is no significant polymerization.

The following examples illustrate the present invention wherein the nickel compound is used in conjunction with component (a) as defined hereinabove.

Example 2

The same catalyst of Example 1 is prepared, but admixed thereto is 0.015 g. molybdenum pentachloride dissolved in 10 cc. toluene, the molar ratio of the nickel compound to the molybdenum compound being equal to 6. The polymerization reaction is then conducted at 55° C. for 7 hours, after which time about 10% of the original butadiene is found in the form of a solid elastomeric polymer having about 95% of its structure in the 1,4-cis form.

When the same reaction is conducted for 20 hours, there are obtained 1.9 g. polybutadiene, of which 96% exhibits the 1,4-cis form, 3% the 1,4-trans form and 1% the vinyl form. This polymer exhibits an intrinsic viscosity of 0.455, as measured in benzene at 30° C.

Under the same reaction conditions outlined in this example, but omitting the bis-(cyclooctadiene) nickel compound, no polymer is produced.

Examples 5–8

These examples are summarized in Table 1, below, showing the effect of different variables, such as the ratio of the nickel compound to the monomer, the molar ratio of the nickel compound to the molybdenum compound, and the reaction time. In all of the examples, the butadiene was dissolved in a solution of toluene, the catalyst being bis-(cyclooctadiene)nickel and molybdenum pentachloride; the reaction was initiated with a starting quantity of butadiene of 5.2 g., and the reaction was conducted at a temperature of 55° C.

TABLE 1

| Example No. | $(C_8H_{12})_2Ni$, g. | $MoCl_5$, g. | Reaction milieu toluene, (cc.) | Reaction time, hr. | Polybutadiene, g. | Microstructure | | | Intrinsic viscosity at 30° C. in benzene |
|---|---|---|---|---|---|---|---|---|---|
| | | | | | | Percent cis | Percent trans | Percent vinyl | |
| 3 | 0.078 | 0.016 | 17 | 20 | 3.4 | 90.0 | 6.5 | 3.5 | |
| 4 | 0.060 | 0.024 | 21 | 20 | 2.5 | 94.0 | 5.5 | 0.5 | 4.00 |
| 5 | 0.100 | 0.055 | 16 | 6 | 4.0 | 94.0 | 4.0 | 2.0 | 2.90 |
| 6 | 0.100 | 0.065 | 17 | 6 | 3.1 | 96.0 | 3.0 | 1.0 | 1.30 |
| 7 | 0.140 | 0.134 | 76 | 6 | 1.6 | 97.0 | 2.7 | 0.3 | 0.30 |
| 8 | 0.140 | 0.060 | 46 | 6 | 3.6 | 96.2 | 3.5 | 0.3 | 0.67 |

Example 9

Starting with 6.8 g. isoprene, dissolved in 27 cc. toluene, there is added a catalyst comprising 0.082 g. bis-(cyclooctadiene)nickel in a solution of 3 cc. toluene, and 0.041 g. molybdenum pentachloride. The reaction mixture is agitated for 6 hours at 40° C., and there is thus obtained 0.4 g. of an insoluble polymer.

Example 10

Example 3 is repeated, with the exception of the substitution of titanium tetrachloride for molybdenum pentachloride in equimolar proportions. There is thus obtained 1.1 g. of a polymer of which the structure is 97% 1,4-cis; 2.4% 1,4-trans; and 0.5% vinyl bonds.

The microstructure of this polymer is completely different from the type of polymer that is obtained by a cationic mechanism—e.i., titanium tetrachloride being the only component. In the latter case, a polymer is obtained which is 75% 1,4-trans and 25% vinyl bonds. (By "vinyl bond" there is meant the structure $CH_2=CH-$.)

Examples 11–19

In the following Table 2, all of the examples were conducted on the basis of 5.2 g. of starting butadiene, and the catalyst employed was bis-(cyclooctadiene)nickel and titanium tetrachloride.

which is essentially 1,4-trans and is 40% crystalline, as determined by X-ray diffraction.

Example 24

Under the same conditions set forth in Example 23, there are added 5 g. butadiene and 4 cc. toluene to 6 cc. of a solution containing 0.165 g. of bis(cyclooctadiene)nickel in 6 cc. of toluene, and 0.053 g. $SbCl_5$ in 3 cc. toluene. There is thus obtained 0.65 g. polybutadiene containing 98% of 1,4-cis units, 1.7% 1,4-trans units, and 0.3% vinyl units, said polymer having an intrinsic viscosity of 0.135, as measured in benzene at 30° C.

Example 25

To 0.016 g. anhydrous ferric chloride, there are added 11 cc. toluene, 5 g. butadiene, and a solution of 0.165 g. bis(cyclooctadiene)nickel in 6 cc. toluene. After the reaction mixture has been agitated for 20 hours at 55° C., there is obtained 0.1 g. polybutadiene containing 85% 1,4-cis units, 14.2% 1,4-trans units, and 0.8% vinyl units.

For an illustration of the 1,4-cis, 1,4-trans, and vinyl bonds, reference is made to "Polymeric Materials," Winding and Hiatt, McGraw-Hill (1961), page 376, where the trans, cis, and vinyl configurations are illustrated, in that order, respectively.

TABLE 2

| Example No. | $(C_8H_{12})_2Ni$, g. | $TiCl_4$, g. | Temp., °C. | Reaction time, hr. | Polybutadiene, g. | Microstructure Percent cis | Percent trans | Percent vinyl | Intrinsic viscosity at 30° C. in benzene |
|---|---|---|---|---|---|---|---|---|---|
| 11 | 0.137 g./5cc. toluene | 0.188 g./13 cc. cyclohexane | 55 | 20 | 3.7 | 95.0 | 4.7 | 0.3 | 0.33 |
| 12 | 0.137 g./15 cc. toluene | 0.047 g./4 cc. cylcohexane | 55 | 20 | 4.5 | 94.5 | 5.0 | 0.5 | 0.66 |
| 13 | 0.137 g./6 cc. toluene | 0.047 g./3 cc. cyclohexane | 55 | 5 | 0.9 | 94.0 | 5.6 | 0.4 | 1.20 |
| 14 | 0.186 g./11 cc. toluene | 0.032 g./2 cc. cyclohexane | 55 | 20 | 2.0 | 91.0 | 8.7 | 0.3 | 0.37 |
| 15 | 0.082 g./3 cc. toluene | 0.028 g./2 cc. heptane | 40 | 13 | 1.5 | 97.0 | 2.6 | 0.4 | 0.56 |
| 16 | 0.276 g./14 cc. cyclohexane | 0.094 g./6 cc. cyclohexane | 55 | 1¾ | 1.0 | 94.0 | 5.7 | 0.3 | 0.75 |
| 17 | do | do | 55 | 3½ | 1.3 | 95.0 | 4.7 | 0.3 | 0 69 |
| 18 | 0.276 g./10 cc. methylene chloride | 0.199 g./10 cc. methylene chloride | 55 | 1¾ | 4.6 | 90.5 | 9.4 | 0.1 | 0.57 |
| 19 | 0.276 g./14 cc. cyclohexane | 0.094 g./6 cc. cyclohexane | 35 | 21 | 3.0 | 94.6 | 5.2 | 0.2 | |

Example 20

In the presence of 0.263 g. of bis-(cyclooctadiene) nickel in 10 cc. of toluene, there are added 5.2 g. butadiene and 0.266 g. titanium tetraiodide in a solution comprising 9 cc. normal heptane. By calculation, it is seen that the molar ratio of nickel:titanium is about 2. After the reaction is conducted for 6 hours at 55° C., 2.8 g. polybutadiene are recovered. This polymer exhibits an intrinsic viscosity of 0.21, and the microstructure thereof is 30% 1,4-cis; 68% 1,4-trans; and 2% vinyl bonds.

Example 21

Example 15 is repeated, but the butadiene is replaced by 6.8 g. isoprene. There is thus obtained after heating at 40° C. for 6 hours, 0.25 g. of a partially insoluble polymer.

Example 22

To a suspension of 0.12 g. anhydrous nickel dichloride in 11 cc. toluene, there are added 5 g. butadiene and a solution of 0.175 g. bis(cyclooctadiene)nickel in toluene. The reaction mass is then agitated for 20 hours at 55° C. There is thus obtained 0.1 g. of a polybutadiene, 82% of which is 1,4-cis, 17.5% is 1,4-trans, and 0.5% is vinyl.

Example 23

Into a suspension of 0.094 g. $NiCl_2.6H_2O$ in 10 cc. absolute ethyl alcohol, there are introduced 6.5 g. butadiene and 0.216 g. bis(cyclooctadiene)nickel in a solution of 6 cc. absolute alcohol, the molar ratio of the bis-compound to the nickel chloride compound being about 2. After the reaction mass has been agitated at 55° C. for 20 hours, there is obtained 0.6 g. of polybutadiene

Example 26

To 5.4 g. of butadiene, there is added 8 cm.³ of a solution of 0.11 g. of 1.5.9-centro-cyclododecatriene nickel in cyclohexane and 0.1 g. of $TiCl_4$ as solution in 2 cm.³ of cyclohexane. The resulting mixture is stirred for 7 hours at 55° C. A yield of 3.2 g. of polybutadiene is obtained, said polybutadiene consisting of 95% cis-1,4, 4% trans-1,4 and 1% vinyl units.

Example 27

Example 26 is repeated except that 0.08 g. of cyclooctatetrane nickel is substituted for centro-cyclododecatriene nickel. 0.5 g. of polybutadiene is obtained consisting of 46% cis-1,4 44% trans-1,4 and 10% vinyl units.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A catalyst composition comprising:
   (a) a halide of a metal selected from the group consisting of Groups IV, V, VI, VII, and VIII of the Periodic Table of the Elements, and
   (b) a hydrocarbon coordination compound of nickel and a cyclopolyolefin having at least 6 carbon atoms per ring.

2. The catalyst composition defined by claim 1 wherein compound (a) is molybdenum pentachloride.

3. The catalyst composition defined by claim 1 wherein compound (a) is titanium tetrachloride.

4. The catalyst composition defined by claim 1 wherein compound (a) is antimony pentachloride.

5. The catalyst composition defined by claim 1 wherein the molar ratio of coordination compound (b) to compound (a) is 0.1:1 to 25:1.

6. The catalyst composition defined by claim 5 wherein said molar ratio is 0.5:1 to 20:1.

7. The catalyst composition defined by claim 5 wherein said molar ratio is 0.5:1 to 2.5:1.

8. The catalyst composition defined by claim 1 wherein said coordination compound (b) is bis(1,5-cyclooctadiene) nickel.

9. The catalyst composition defined by claim 2 wherein said coordination compound (b) is bis(1,5-cyclooctadiene) nickel.

10. A process for the polymerization of a conjugated diolefin, said process comprising the step of polymerizing said conjugated diolefin in intimate contact with a catalyst as defined by claim 1.

11. A process for the polymerization of a conjugated diolefin, said process comprising the step of polymerizing said conjugated diolefin in intimate contact with a catalyst as defined by claim 9.

12. A process as defined by claim 10 wherein said conjugated diolefin is butadiene.

13. A process as defined by claim 11 wherein said conjugated diolefin is butadiene.

No references cited.

JOSEPH L. SCHOFER, *Primary Examiner.*

R. A. GAITHER, *Assistant Examiner.*